(12) United States Patent
Wang et al.

(10) Patent No.: US 7,896,336 B2
(45) Date of Patent: Mar. 1, 2011

(54) SOLENOID VALVE DEVICE AND AUTOMATIC DOCUMENT FEEDER HAVING SUCH SOLENOID VALVE DEVICE

(75) Inventors: Chung-Kai Wang, Taipei (TW);
Wen-An Huang, Taipei (TW);
Chao-Min Yang, Taipei (TW);
Wei-Hsun Hsu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 151 days.

(21) Appl. No.: 12/484,009

(22) Filed: Jun. 12, 2009

(65) Prior Publication Data

US 2010/0276865 A1     Nov. 4, 2010

(30) Foreign Application Priority Data

Apr. 30, 2009   (TW) ................. 98114330 A

(51) Int. Cl.
*B65H 3/44* (2006.01)
*H01F 7/08* (2006.01)
*H01F 1/00* (2006.01)

(52) U.S. Cl. ............... 271/9.01; 271/9.05; 271/9.13; 335/255; 335/257; 335/277

(58) Field of Classification Search ............... 271/9.01, 271/9.05, 9.13; 335/255, 257, 277
See application file for complete search history.

(56) References Cited

U.S. PATENT DOCUMENTS

| | | | | |
|---|---|---|---|---|
| 1,978,737 | A * | 10/1934 | Bower et al. | 361/154 |
| 3,400,351 | A * | 9/1968 | Flentge | 335/257 |
| 3,609,610 | A * | 9/1971 | Flentge | 335/278 |
| 3,890,587 | A * | 6/1975 | Field | 335/255 |
| 4,845,451 | A * | 7/1989 | Uetsuhara et al. | 335/257 |
| 5,066,980 | A * | 11/1991 | Schweizer | 335/255 |
| 5,652,560 | A * | 7/1997 | Carter et al. | 335/255 |
| 6,595,485 | B2 * | 7/2003 | Burrola et al. | 251/64 |
| 6,935,612 | B2 * | 8/2005 | McCombs et al. | 251/129.15 |
| 7,806,397 | B2 * | 10/2010 | Wang et al. | 271/9.09 |

* cited by examiner

*Primary Examiner* — David H Bollinger
(74) *Attorney, Agent, or Firm* — Kirton & McConkie; Evan R. Witt

(57) ABSTRACT

A solenoid valve and an automatic document feeder using the solenoid valve are provided. The solenoid valve includes a valve body, a valve spindle, a spring, a ring-shaped groove and muffling ring. The ring-shaped groove is sheathed around the valve spindle. The muffling ring is disposed within the ring-shaped groove. When the valve body is magnetized to magnetically attract the valve spindle, the valve spindle is moved within the valve body, and the muffling ring collides with the recess inner wall, thereby reducing collision noise.

21 Claims, 4 Drawing Sheets

SOLENOID VALVE DEVICE AND AUTOMATIC DOCUMENT FEEDER HAVING SUCH SOLENOID VALVE DEVICE

FIELD OF THE INVENTION

The present invention relates to a power device, and more particularly to a solenoid valve for converting electrical energy into magnetic energy.

BACKGROUND OF THE INVENTION

A solenoid valve is an electromechanical device for converting electrical energy into magnetic energy. The solenoid valves are found in many application areas. For complying with diverse requirements of different application areas, the manufacturers of the solenoid valves have produced various solenoid valves of different sizes.

FIG. 1 is a schematic perspective view illustrating a conventional solenoid valve. As shown in FIG. 1, the conventional solenoid valve 1 comprises a valve body 10, a valve spindle 11 and a spring 12. The valve body 10 comprises a magnetic coil 101 and a recess 102. The magnetic coil 101 encloses the valve body 10. A recess sidewall 1021 is perpendicular to a recess bottom 1022. The valve spindle 11 is partially inserted into the recess 102 of the valve body 10, so that the valve spindle 11 could be toward the recess bottom 1022 along the recess sidewall 1021. In addition, the valve spindle 11 has a tip part 111 and a protruding edge 112. The tip part 111 and the protruding edge 112 are respectively disposed at two opposite ends of the valve spindle 11. The spring 12 is partially sheathed around the valve spindle 11 and contacted with the protruding edge 112 and the valve body 10. An example of the spring 12 is a helical spring.

Please refer to FIG. 1 again. When a current flows through the magnetic coil 101, electrical energy is converted into magnetic energy by the magnetic coil 101, and thus the valve body 10 is magnetized. As such, a magnetic force is generated by the valve body 10. Due to the magnetic force, the valve spindle 11 is magnetically attracted and moved toward the recess bottom 1022 along the recess sidewall 1021. As the valve spindle 11 is moved toward the recess bottom 1022, the protruding edge 112 is sustained against the spring 12 so as to compress the spring 12. Eventually, the tip part 111 of the valve spindle 11 will collide with the recess bottom 1022. On the other hand, when no current flows through the magnetic coil 101, the valve body 10 is not magnetized and the magnetic force is lost. Since the force offered to compress the spring 12 is eliminated, the compressed spring 12 will be restored. The restoring force of the spring 12 causes the valve spindle 11 to return to its original position where the valve body 10 has not been magnetized. In other words, the valve spindle 11 is moved in a direction distant from the recess bottom 1022.

According to the above-mentioned reciprocating motion of the valve spindle 11, electrical energy is converted into magnetic energy by the solenoid valve 1. During operation of the solenoid valve 1, the tip part 111 of the valve spindle 11 collides with the recess bottom 1022, and thus noise is caused by the collision between the valve spindle 11 and the recess bottom 1022. Due to the configuration of the solenoid valve 1, the noise is usually amplified into low-frequency noise. The low-frequency noise is very sensitive to the human beings. The low-frequency noise is not pleasing to the ears even if the sound volume of the low-frequency noise is very small. In other words, the noise caused by the collision between the valve spindle II and the recess bottom 1022 is unfavorable to most users.

SUMMARY OF THE INVENTION

It is an object of the present invention to provide a solenoid valve with reduced collision noise.

Another object of the present invention provides an automatic document feeder with reduced collision noise.

In accordance with an aspect of the present invention, there is provided a solenoid valve with reduced collision noise. The solenoid valve includes a valve body, a valve spindle, a spring, a ring-shaped groove and muffling ring. The valve body includes a magnetic coil and a recess. The magnetic coil encloses the valve body. The recess includes a recess sidewall, a recess bottom and a recess inner wall. The recess inner wall is arranged between the recess sidewall and the recess bottom. A first included angle is defined between the recess inner wall and the recess sidewall. A second included angle is defined between the recess inner wall and the recess bottom. The valve spindle is partially inserted into the recess of the valve body and movable toward the recess bottom along the recess sidewall. The valve spindle includes a tip part at a first end and a protruding edge at a second end. The spring is sheathed around the valve spindle and contacted with the protruding edge and the valve body. The ring-shaped groove is sheathed around the valve spindle and arranged at a bottom of the tip part. The muffling ring is disposed within the ring-shaped groove. When the valve body is magnetized to magnetically attract the valve spindle, the valve spindle is moved in the recess and toward the recess bottom, the spring is compressed by the protruding edge, and the muffling ring collides with the recess inner wall, thereby buffering collision between the tip part and the recess bottom.

In an embodiment, the height of the tip part is smaller than the vertical height of the recess inner wall.

In an embodiment, the tip part of the valve spindle is a flat head cone, and the ring-shaped groove is arranged at a bottom of the flat head cone.

In an embodiment, the first included angle between the recess inner wall and the recess sidewall is equal to an inclined angle of the flat head cone.

In an embodiment, when the spring is compressed and the valve body is not magnetized, a restoring force of the spring is exerted on the protruding edge, so that the valve spindle is moved in a direction distant from the recess bottom.

In an embodiment, the spring is a helical spring.

In an embodiment, the valve spindle further includes a coupling part, which is arranged beside the protruding edge.

In an embodiment, the tip part, the protruding edge and the coupling part are integrally formed with the valve spindle.

In an embodiment, the valve spindle is a cylindrical spindle and the muffling ring is a C-shaped ring.

In an embodiment, the muffling ring is made of Polyslider.

In accordance with another aspect of the present invention, there is provided an automatic document feeder. The automatic document feeder includes an ordinary document input tray, an ordinary document pick-up roller, a business card input tray, a business card pick-up roller assembly, an ejecting tray, a transfer channel, multiple transfer rollers, an ejecting roller assembly and a power-switching unit. The ordinary document input tray is used for placing an ordinary document thereon. The ordinary document pick-up roller is used for feeding the ordinary document on the ordinary document input tray into an internal portion of the automatic document feeder. The business card input tray is used for placing a business card thereon. The business card pick-up roller assembly is fixed on the business card input tray for feeding the business card that is placed on the business card input tray. The ejecting tray is used for supporting the ordinary document or the business card after being scanned. The transfer channel is used for leading the ordinary document. The transfer rollers are used for transporting the ordinary document or the business card. The ejecting roller assembly is used for transporting the ordinary document or the business card to the ejecting tray. The power-switching unit is used for driving the ordinary document pick-up roller or the business card pick-up roller assembly. The power-switching unit includes a solenoid valve, a switching element and a fastening arm. The solenoid valve includes a valve body, a valve spindle, a spring, a ring-shaped groove and muffling ring. The valve body includes a magnetic coil and a recess. The magnetic coil encloses the valve body. The recess includes a recess sidewall, a recess bottom and a recess inner wall. The recess inner wall is arranged between the recess sidewall and the recess bottom. A first included angle is defined between the recess inner wall and the recess sidewall. A second included angle is defined between the recess inner wall and the recess bottom. The valve spindle is partially inserted into the recess of the valve body and movable toward the recess bottom along the recess sidewall. The valve spindle includes a tip part at a first end and a protruding edge at a second end. The spring is sheathed around the valve spindle and contacted with the protruding edge and the valve body. The ring-shaped groove is sheathed around the valve spindle and arranged at a bottom of the tip part. The muffling ring is disposed within the ring-shaped groove. When the valve body is magnetized to magnetically attract the valve spindle, the valve spindle is moved in the recess and toward the recess bottom, the spring is compressed by the protruding edge, and the muffling ring collides with the recess inner wall, thereby buffering collision between the tip part and the recess bottom. The switching element is disposed beside the solenoid valve, and has a first notch and a second notch. The fastening arm is connected with the valve spindle, and swung according to an action of the solenoid valve, so that the fastening arm is fixed in the first notch or the second notch.

In an embodiment, the height of the tip part is smaller than the vertical height of the recess inner wall.

In an embodiment, the tip part of the valve spindle is a flat head cone, and the ring-shaped groove is arranged at a bottom of the flat head cone.

In an embodiment, the first included angle between the recess inner wall and the recess sidewall is equal to an inclined angle of the flat head cone.

In an embodiment, when the spring is compressed and the valve body is not magnetized, a restoring force of the spring is exerted on the protruding edge, so that the valve spindle is moved in a direction distant from the recess bottom.

In an embodiment, the spring is a helical spring.

In an embodiment, the valve spindle further includes a coupling part, which is arranged beside the protruding edge.

In an embodiment, the tip part, the protruding edge and the coupling part are integrally formed with the valve spindle.

In an embodiment, the valve spindle is a cylindrical spindle and the muffling ring is a C-shaped ring.

In an embodiment, the muffling ring is made of Polyslider.

In an embodiment, the switching element further includes a driving gear for driving the ordinary document pick-up roller or the business card pick-up roller assembly.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
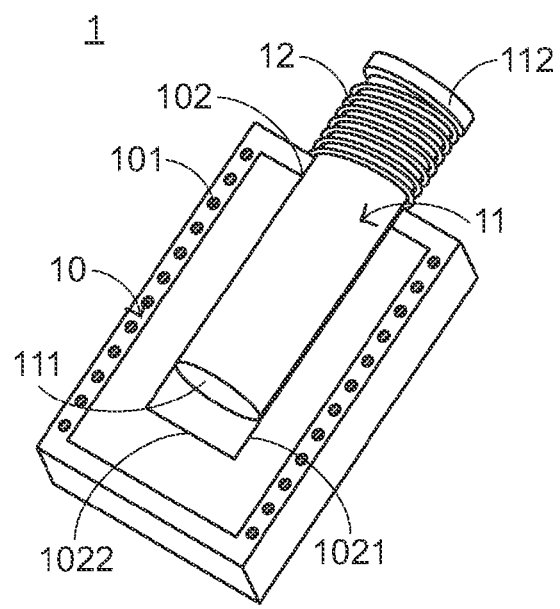
FIG. 1 is a schematic perspective view illustrating a conventional solenoid valve.
Figure 2:
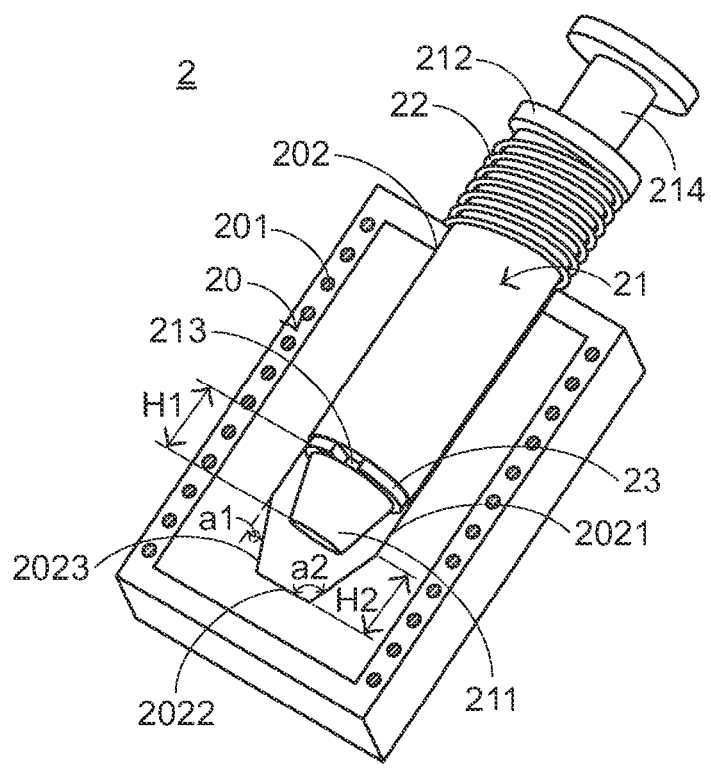
FIG. 2 is a schematic perspective view illustrating a solenoid valve according to an embodiment of the present invention.

For reducing the noise caused by the collision, the present invention provides a solenoid valve having a muffling structure. FIG. 2 is a schematic perspective view illustrating a solenoid valve according to an embodiment of the present invention. As shown in FIG. 2, the solenoid valve 2 comprises a valve body 20, a valve spindle 21, a spring 22, a ring-shaped groove 213 and a muffling ring 23. The valve body 20 comprises a magnetic coil 201 and a recess 202. The magnetic coil 201 encloses the valve body 20 in order to generate a magnetic force. The recess 202 comprises a recess sidewall 2021, a recess bottom 2022 and a recess inner wall 2023. The recess inner wall 2023 is arranged between the recess sidewall 2021 and the recess bottom 2022. A first included angle a1 is defined between the recess inner wall 2023 and the recess sidewall 2021. A second included angle a2 is defined between the recess inner wall 2023 and the recess bottom 2022. In addition, the valve spindle 21 has a tip part 211 and a protruding edge 212. The tip part 211 and the protruding edge 212 are respectively disposed at a first and a second end of the valve spindle 21. The valve spindle 21 is partially inserted into the recess 202 of the valve body 20, so that the valve spindle 21 is movable along the recess sidewall 2021. The ring-shaped groove 213 is sheathed around the valve spindle 21 and arranged at the bottom of the tip part 211. In this embodiment, the tip part 211 is substantially a flat head cone. That is, the ring-shaped groove 213 is arranged at the bottom of the flat head cone 211. The muffling ring 23 is disposed and fixed within the ring-shaped groove 213. In this embodiment, the valve spindle 21 is a cylindrical spindle. For facilitating embedding the muffling ring 23 within the ring-shaped groove 213, the muffling ring 23 is a C-shaped ring. The spring 22 is sheathed around the valve spindle 21 and contacted with the protruding edge 212 at the second end of the valve spindle 21 and the valve body 20. An example of the spring 22 is a helical spring. Moreover, the valve spindle 21 further comprises a coupling part 214. The coupling part 214 is disposed beside the protruding edge 212. It is preferred that the tip part 211, the protruding edge 212 and the coupling part 214 are integrally formed with the valve spindle 21.

In this embodiment, the first included angle a1 between the recess inner wall 2023 and the recess sidewall 2021 is equal to the inclined angle of the flat head cone 211. As such, when the valve spindle 21 is moved along the recess sidewall 2021 and contacted with the recess bottom 2022, the flat head cone 211 of the valve spindle 21 is accommodated within the space between the recess bottom 2022 and the recess inner wall 2023. That is, the flat head cone 211 and the space between the recess bottom 2022 and the recess inner wall 2023 have complementary shapes.

Hereinafter, the operations of the solenoid valve 2 will be illustrated in more details with reference to FIG. 2. When a current flows through the magnetic coil 201, electrical energy is converted into magnetic energy by the magnetic coil 201, and thus the valve body 20 is magnetized. As such, a magnetic force is generated by the valve body 20. Due to the magnetic force, the valve spindle 21 is magnetically attracted and moved toward the recess bottom 2022 along the recess sidewall 2021. As the valve spindle 21 is moved toward the recess bottom 2022, the protruding edge 212 is sustained against the spring 22 so as to compress the spring 22. On the other hand, when no current flows through the magnetic coil 201, the valve body 20 is not magnetized and the magnetic force is lost. Since the force offered to compress the spring 22 is eliminated, the compressed spring 22 will be restored. The restoring force of the spring 22 causes the valve spindle 21 to return to its original position where the valve body 20 has not been magnetized. In other words, the valve spindle 21 is moved in a direction distant from the recess bottom 2022.

When the valve spindle 21 is magnetically attracted by the valve body 20 and moved in the recess 202 toward the recess bottom 2022, the muffling ring 23 disposed within the ring-shaped groove 213 collides with the recess inner wall 2023, thereby buffering the collision between the flat head cone 211 and the recess bottom 2022. Under this circumstance, the noise caused by the collision between the valve spindle 21 and the valve body 20 is reduced. For further buffering the collision between the valve spindle 21 and the recess 202, the height of the tip part 211 of the valve spindle 21 is reduced. As shown in FIG. 2, the height H1 of the tip part 211 is smaller than the vertical height H2 of the recess inner wall 2023. According to this specific design, the tip part 211 will no longer collide with the recess bottom 2022 when the valve spindle 21 is close to the recess bottom 2022, thereby enhancing the muffling effect. It is preferred that the muffling ring 23 is made of Polyslider. As known, Polyslider has flexibility and rigidity. Due to the advantage of flexibility, the muffling ring 23 is suitable as a C-shaped ring. Due to the advantage of rigidity, the muffling ring 23 can withstand the collision between the valve spindle 21 and the recess inner wall 2023 and withstand the inner temperature of the valve body 20 without being molten.

Figure 3:
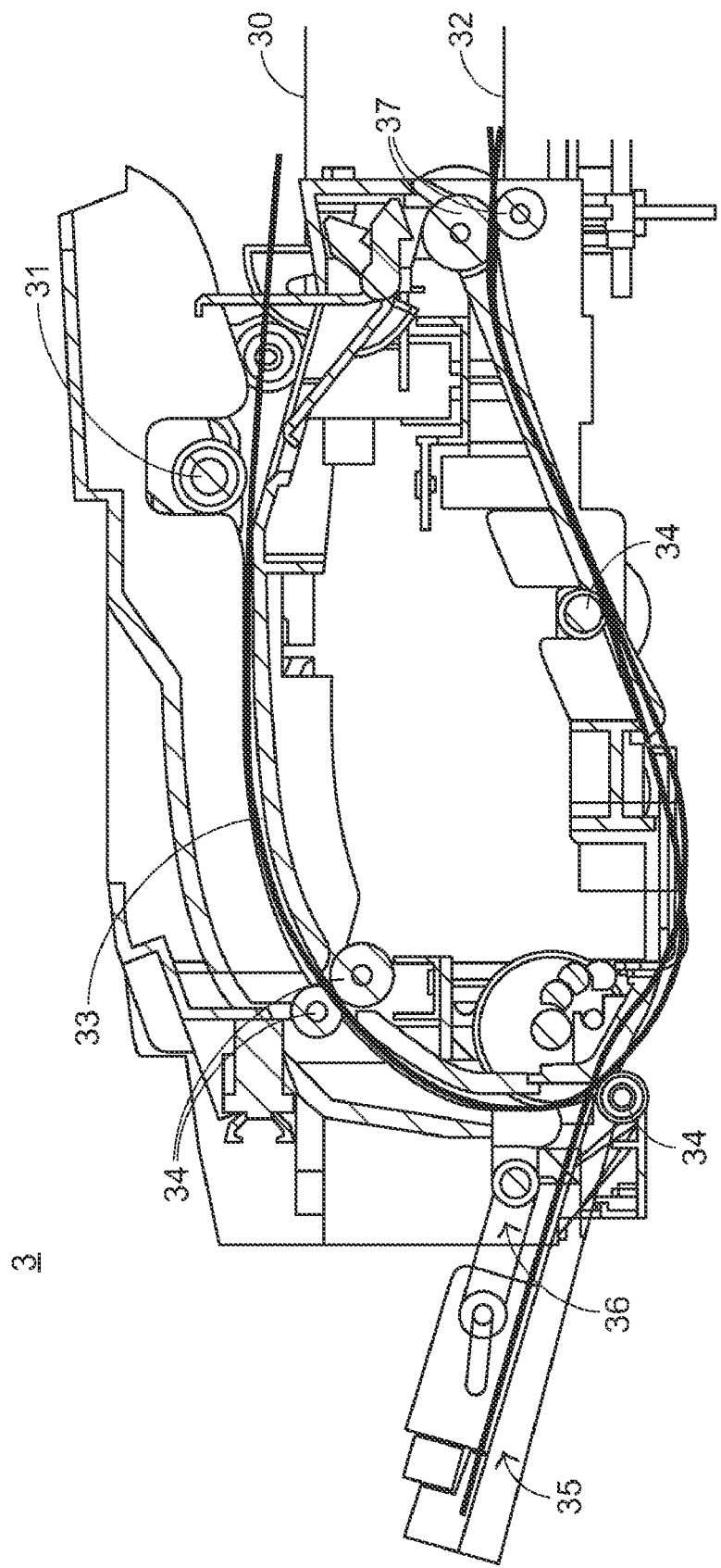
FIG. 3 is a schematic cross-sectional view illustrating an automatic document feeder having a solenoid valve of the present invention.

The solenoid valve of the present invention can be applied to an automatic document feeder. FIG. 3 is a schematic cross-sectional view illustrating an automatic document feeder having a solenoid valve of the present invention. As shown in FIG. 3, the automatic document feeder 3 comprises an ordinary document input tray 30, an ordinary document pick-up roller 31, an ejecting tray 32, a transfer channel 33, multiple transfer rollers 34, and ejecting roller assembly 37, a business card input tray 35, a business card pick-up roller assembly 36 and a power-switching unit 38 (see FIG. 4). The ordinary document input tray 30 is used for placing thereon the ordinary documents to be scanned (not shown). The business card input tray 35 is used for placing thereon the business cards to be scanned (not shown). The ordinary document pick-up roller 31 is disposed in the vicinity of the ordinary document input tray 30 for feeding the ordinary documents that are placed on the ordinary document input tray 30 into the internal portion of the automatic document feeder 3. The ejecting tray 32 is arranged below the ordinary document input tray 30 for supporting thereon the ordinary documents or the business cards after being scanned. The ejecting roller assembly 37 is used for transporting the scanned ordinary documents or the scanned business cards to the ejecting tray 32. The transfer channel 33 is used for transporting the ordinary documents or the business cards. The transfer rollers 34 are arranged in the transfer channel 33 for transporting the ordinary documents or the business cards through the transfer channel 33. The power-switching unit 38 is used for driving the ordinary document pick-up roller 31 or the business card pick-up roller assembly 36.

The process of feeding ordinary documents by using the automatic document feeder 3 will be illustrated as follows. First of all, the ordinary documents to be scanned are placed on the ordinary document input tray 30. For scanning the ordinary documents, the ordinary documents are successively fed into the transfer channel 33 by the ordinary document pick-up roller 31. Next, the ordinary documents are transported in the transfer channel 33. After the ordinary documents are scanned by a scanning module (not shown), the ordinary documents are transported by the ejecting roller assembly 37 and thus exited to the ejecting tray 32.

The process of feeding business cards by using the automatic document feeder 3 will be illustrated as follows. First of all, the business cards to be scanned are placed on the business card input tray 35. Next, the business cards are successively fed into the transfer channel 33 by the business card pick-up roller assembly 36. Next, the business cards are fed into the internal portion of the automatic document feeder 3 by the transfer rollers 34 that are arranged in the transfer channel 33. After the business cards are scanned by the scanning module, the business cards are transported by the ejecting roller assembly 37 and thus exited to the ejecting tray 32.

Figure 4:
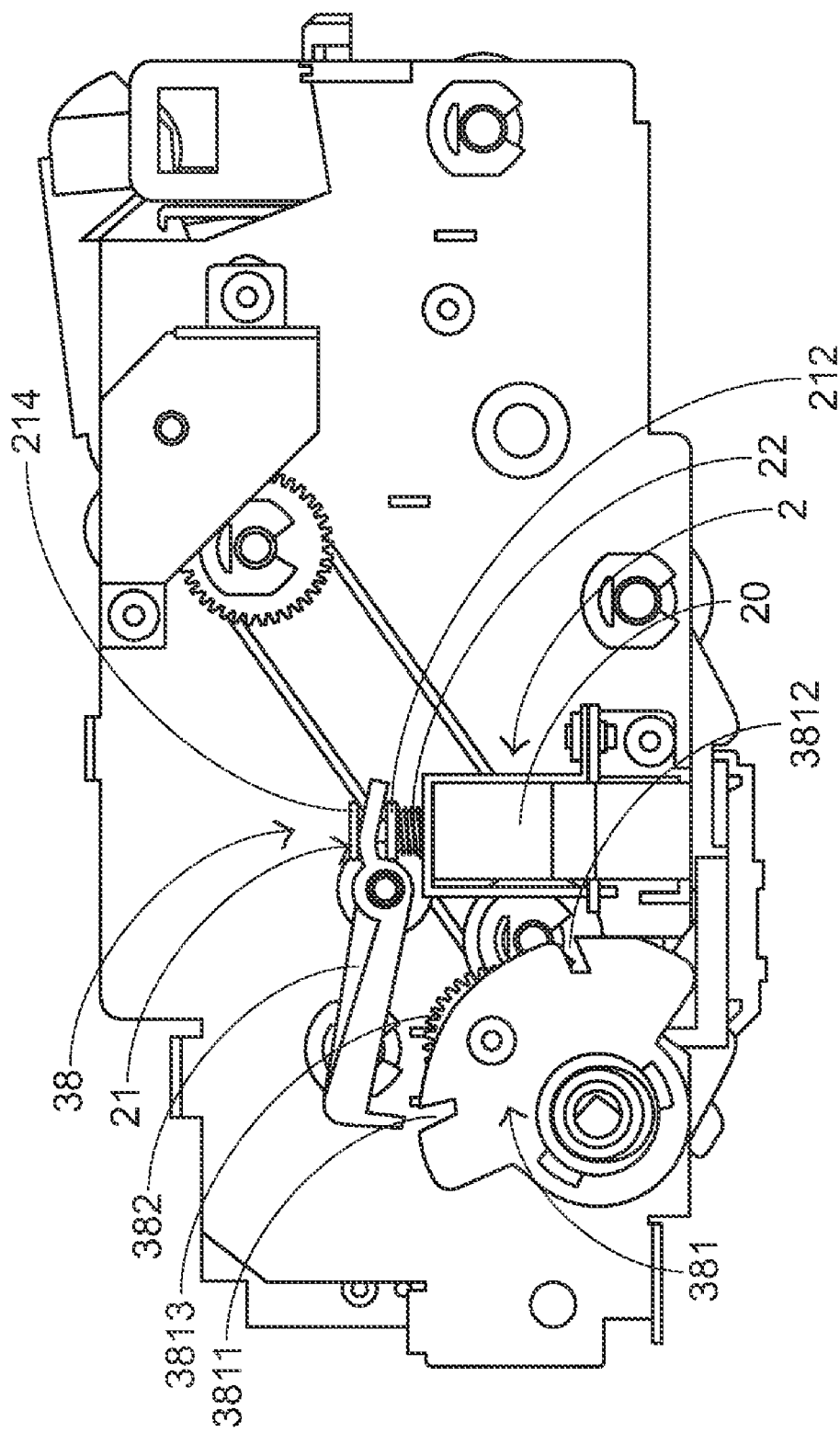
FIG. 4 is a schematic cross-sectional view illustrating the power-switching unit of the automatic document feeder of the present invention.

By means of the power-switching unit 38, the automatic document feeder 3 is switched between a business card feeding mode and an ordinary document feeding mode. FIG. 4 is a schematic cross-sectional view illustrating the power-switching unit of the automatic document feeder of the present invention. The power-switching unit 38 of the automatic document feeder 3 comprises a solenoid valve 2, a switching element 381 and a fastening arm 382. The coupling part 214 of the solenoid valve 2 is connected with the fastening arm 382. The configurations and the operating principles of the solenoid valve 2 have been illustrated in FIG. 2, and are not redundantly described herein.

The switching element 381 is disposed beside the solenoid valve 2. The switching element 381 comprises a first notch 3811, a second notch 3812 and a driving gear 3813. The driving gear 3813 is used for driving the ordinary document pick-up roller 31 or the business card pick-up roller assembly 36. The fastening arm 382 is connected with the coupling part 214 of the solenoid valve 2. The fastening arm 382 could be swung according to the operations of the solenoid valve 2 so as to be fixed in the first notch 3811 or the second notch 3812.

In a case that the automatic document feeder 3 in operated in the ordinary document feeding mode, the valve spindle 21 of the solenoid valve 2 is not magnetically attracted by the valve body 20 and the spring 22 is not compressed. At this moment, the fastening arm 382 that is connected with the valve spindle 21 is fixed in the first notch 3811. In addition, the driving gear 3813 is engaged with the gear (not shown) of the ordinary document pick-up roller 31, thereby driving the ordinary document pick-up roller 31. Whereas, in a case that the automatic document feeder 3 in operated in the business card feeding mode, the valve spindle 21 of the solenoid valve 2 is magnetically attracted by the valve body 20 and moved. As the valve spindle 21 is moved, the spring 22 is compressed, and the fastening arm 382 is correspondingly rotated. Therefore, the fastening arm 382 is disconnected from the first notch 3811, as is shown in FIG. 4.

Figure 5:
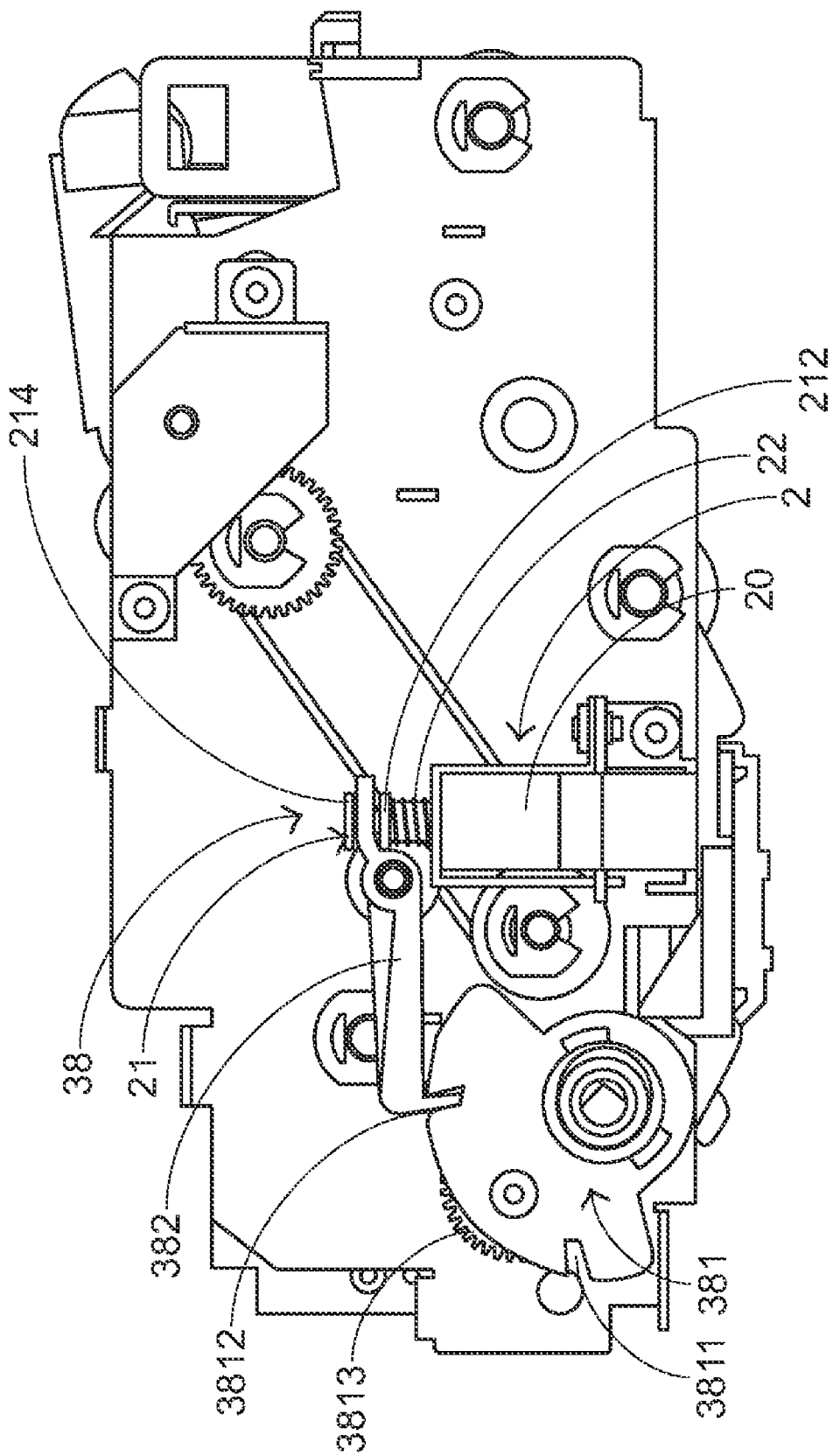
FIG. 5 is a schematic cross-sectional view illustrating the automatic document feeder operated in a business card feeding mode.

After the fastening arm 382 is disconnected from the first notch 3811, the switching element 381 is rotated in an anti-clockwise direction. The power source for rotating the switching element 381 is for example a motor (not shown). At this moment, no current flows through the magnetic coil 101, and thus the valve body 20 is not magnetized by the valve spindle 21. Since the force offered to compress the spring 22 is eliminated, the compressed spring 22 will be restored. The restoring force of the spring 22 causes the valve spindle 21 to return to its original position where the valve body 20 has not been magnetized. On the other hand, as the valve spindle 21 is moved, the fastening arm 382 is swung, so that the fastening arm 382 is fixed in the second notch 3812. In addition, the driving gear 3813 is engaged with the gear (not shown) of the business card pick-up roller assembly 36, thereby driving the business card pick-up roller assembly 36 (see FIG. 5).

From the above description, since the tip part of the valve spindle is substantially a flat head cone and the height of the flat head cone is shortened, the colliding point between the valve spindle and the valve body is shifted. In addition, since the ring-shaped groove is sheathed around said valve spindle and the muffling ring is disposed within the ring-shaped groove, the collision between the valve spindle and the valve body is buffered. According to the specific design, the solenoid valve of the present invention has reduced collision noise. Moreover, in a case that the solenoid valve with educed collision noise is applied to an automatic document feeder, the collision noise generated during the process of switching the operating mode of the automatic document feeder will be largely reduced. In comparison with the prior art, the muffling efficacy of the present invention is enhanced and the problems resulting from the troublesome noise are overcome.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A solenoid valve with reduced collision noise, said solenoid valve comprising:
    a valve body comprising:
        a magnetic coil enclosing said valve body; and
        a recess comprising a recess sidewall, a recess bottom and a recess inner wall, wherein said recess inner wall is arranged between said recess sidewall and said recess bottom, a first included angle is defined between said recess inner wall and said recess sidewall, and a second included angle is defined between said recess inner wall and said recess bottom;
    a valve spindle partially inserted into said recess of said valve body and movable toward said recess bottom along said recess sidewall, wherein said valve spindle comprises a tip part at a first end and a protruding edge at a second end;
    a spring sheathed around said valve spindle, and contacted with said protruding edge and said valve body;
    a ring-shaped groove sheathed around said valve spindle and arranged at a bottom of said tip part; and
    a muffling ring disposed within said ring-shaped groove, wherein when said valve body is magnetized to magnetically attract said valve spindle, said valve spindle is moved in said recess and toward said recess bottom, said spring is compressed by said protruding edge, and said muffling ring collides with said recess inner wall, thereby buffering collision between said tip part and said recess bottom.

2. The solenoid valve according to claim 1 wherein the height of said tip part is smaller than the vertical height of said recess inner wall.

3. The solenoid valve according to claim 1 wherein said tip part of said valve spindle is a flat head cone, and said ring-shaped groove is arranged at a bottom of said flat head cone.

4. The solenoid valve according to claim 3 wherein said first included angle between said recess inner wall and said recess sidewall is equal to an inclined angle of said flat head cone.

5. The solenoid valve according to claim 1 wherein when said spring is compressed and said valve body is not magnetized, a restoring force of said spring is exerted on said protruding edge, so that said valve spindle is moved in a direction distant from said recess bottom.

6. The solenoid valve according to claim 1 wherein said spring is a helical spring.

7. The solenoid valve according to claim 1 wherein said valve spindle further comprises a coupling part, which is arranged beside said protruding edge.

8. The solenoid valve according to claim 7 wherein said tip part, said protruding edge and said coupling part are integrally formed with said valve spindle.

9. The solenoid valve according to claim 1 wherein said valve spindle is a cylindrical spindle and said muffling ring is a C-shaped ring.

10. The solenoid valve according to claim 1 wherein said muffling ring is made of Polyslider.

11. An automatic document feeder comprising:
    an ordinary document input tray for placing an ordinary document thereon;
    an ordinary document pick-up roller for feeding said ordinary document on said ordinary document input tray into an internal portion of said automatic document feeder;
    a business card input tray for placing a business card thereon;
    a business card pick-up roller assembly fixed on said business card input tray for feeding said business card that is placed on said business card input tray;
    an ejecting tray for supporting said ordinary document or said business card after being scanned;
    a transfer channel for leading said ordinary document;
    multiple transfer rollers for transporting said ordinary document or said business card;
    an ejecting roller assembly for transporting said ordinary document or said business card to said ejecting tray; and
    a power-switching unit for driving said ordinary document pick-up roller or said business card pick-up roller assembly, and said power-switching unit comprising:
        a solenoid valve comprising a valve body, a valve spindle, a spring, a ring-shaped groove and muffling ring, wherein said valve body comprises a magnetic coil and a recess, said magnetic coil encloses said valve body, said recess comprises a recess sidewall, a recess bottom and a recess inner wall, said recess inner wall is arranged between said recess sidewall and said recess bottom, a first included angle is defined between said recess inner wall and said recess sidewall, a second included angle is defined between said recess inner wall and said recess bottom, said valve spindle is partially inserted into said recess of said valve body and movable toward said recess bottom along said recess sidewall, said valve spindle comprises a tip part at a first end and a protruding edge at a second end, said spring is sheathed around said valve spindle and contacted with said protruding edge and said valve body, said ring-shaped groove is sheathed around said valve spindle and arranged at a bottom of said tip part, said muffling ring is disposed within said ring-shaped groove, wherein when said valve body is magnetized to magnetically attract said valve spindle, said valve spindle is moved in said recess and toward said recess bottom, said spring is compressed by said protruding edge, and said muffling ring collides with said recess inner wall, thereby buffering collision between said tip part and said recess bottom;

a switching element disposed beside said solenoid valve, and having a first notch and a second notch; and a fastening arm connected with said valve spindle, and swung according to an action of said solenoid valve, so that said fastening arm is fixed in said first notch or said second notch.

12. The automatic document feeder according to claim 11 wherein the height of said tip part is smaller than the vertical height of said recess inner wall.

13. The automatic document feeder according to claim 11 wherein said tip part of said valve spindle is a flat head cone, and said ring-shaped groove is arranged at a bottom of said flat head cone.

14. The automatic document feeder according to claim 13 wherein said first included angle between said recess inner wall and said recess sidewall is equal to an inclined angle of said flat head cone.

15. The automatic document feeder according to claim 11 wherein when said spring is compressed and said valve body is not magnetized, a restoring force of said spring is exerted on said protruding edge, so that said valve spindle is moved in a direction distant from said recess bottom.

16. The automatic document feeder according to claim 11 wherein said spring is a helical spring.

17. The automatic document feeder according to claim 11 wherein said valve spindle further comprises a coupling part, which is arranged beside said protruding edge.

18. The automatic document feeder according to claim 17 wherein said tip part, said protruding edge and said coupling part are integrally formed with said valve spindle.

19. The automatic document feeder according to claim 11 wherein said valve spindle is a cylindrical spindle and said muffling ring is a C-shaped ring.

20. The automatic document feeder according to claim 11 wherein said muffling ring is made of Polyslider.

21. The automatic document feeder according to claim 11 wherein said switching element further comprises a driving gear for driving said ordinary document pick-up roller or said business card pick-up roller assembly.

* * * * *